United States Patent
Hans

(10) Patent No.: US 9,976,872 B2
(45) Date of Patent: May 22, 2018

(54) ROTATIONAL ANGLE SENSOR

(71) Applicant: Hauke Hans, Schweinfurt (DE)

(72) Inventor: Hauke Hans, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 890 days.

(21) Appl. No.: 14/364,758

(22) PCT Filed: Dec. 5, 2012

(86) PCT No.: PCT/EP2012/074460
§ 371 (c)(1),
(2) Date: Jun. 12, 2014

(87) PCT Pub. No.: WO2013/087470
PCT Pub. Date: Jun. 20, 2013

(65) Prior Publication Data
US 2015/0130449 A1 May 14, 2015

(30) Foreign Application Priority Data
Dec. 12, 2011 (DE) .......... 10 2011 088 231

(51) Int. Cl.
G01D 5/12 (2006.01)
G01D 5/14 (2006.01)
(Continued)

(52) U.S. Cl.
CPC .............. G01D 5/12 (2013.01); B62D 1/046 (2013.01); G01D 5/145 (2013.01)

(58) Field of Classification Search
CPC ............ G01D 5/12; G01D 5/145; G01D 5/20; G01D 5/34707; G01D 5/3473
(Continued)

(56) References Cited

U.S. PATENT DOCUMENTS

| 6,222,359 | B1 | 4/2001 | Duesler et al. |
| 2003/0076088 | A1* | 4/2003 | Apel ............ G01D 5/145 324/207.2 |
| 2007/0000455 | A1* | 1/2007 | Akiyama ......... F02D 11/106 123/19 |

FOREIGN PATENT DOCUMENTS

WO 2010055370 A 5/2010

OTHER PUBLICATIONS

International Search Report dated Feb. 28, 2013 from parent application PCT/EP2012/074460.

* cited by examiner

Primary Examiner — Melissa Koval
Assistant Examiner — Trung Nguyen
(74) Attorney, Agent, or Firm — Bryan Peckjian; SKF USA Inc. Patent Dept.

(57) ABSTRACT

A rotational angle sensor for determining an angular position of a reference component with respect to an axial direction includes a magnet retaining component having a magnet. The magnet retaining component is connectable to the reference component via an interference-fit connection so as to rotate with the reference component while being axially displaceable relative to the reference component. The rotational angle sensor also includes a sensor attached to the reference component such that it can rotate with respect to the reference component, and the sensor is configured to detect a magnetic field generated by the magnet. Also included is a spring element configured to exert an axial force on the magnet retaining component so that an axial spacing between the sensor and the magnet assumes a predetermined value.

12 Claims, 5 Drawing Sheets

(51) Int. Cl.
  *B62D 1/04* (2006.01)
  *G01G 1/38* (2006.01)
(58) Field of Classification Search
  USPC ........ 324/200, 207.2–207.25, 226, 631, 166,
  324/160, 600, 167, 76.11
  See application file for complete search history.

ROTATIONAL ANGLE SENSOR

CROSS-REFERENCE

This application is the U.S. National Stage of International Application No. PCT/EP2012/074460 filed on Dec. 5, 2012, which claims priority to German patent application no. 10 2011 088 231.6 filed on Dec. 12, 2011.

TECHNOLOGICAL FIELD

Exemplary embodiments relate to a rotational angle sensor for determining a rotational angle of a reference component with respect to an axial direction, for example to a rotational angle sensor for determining a steering angle of a wheel of a motor vehicle.

BACKGROUND

In many machines and systems, rotational movements occur between individual components and subassemblies which should be detected during operation of the respective machine. Motor vehicles, for example all-terrain motor vehicles, trucks, buses, or other automobiles represent examples thereof. For corresponding motor vehicles it can thus be advisable, for example, to detect the current steering angle of one or more steered wheels, wherein these can be both driven and non-driven wheels. But even with non-steered wheels it can possibly be interesting to determine their current orientation with respect to the longitudinal axis of the motor vehicle.

The detected steering angle or—angles of one or more wheels can, for example, also be used in the context of the monitoring, controlling, and/or optionally the regulating of a steering system of the respective motor vehicle, such as, for example, in the context of systems for monitoring and optionally influencing current, dynamic-driving conditions, of which an anti-lock braking system (ABS) and a traction control system (TCS) represent only two examples.

For this purpose it is possible, for example, to determine the particular steering angle directly in the region of the steered wheel or wheels. Thus, for example, WO 2010/055370 A1 describes a device for determining a steering angle of a stub axle bolt or a kingpin of an Ackermann steering system. The device described in WO 2010/055370 A1 represents a relatively large and complex device which possibly even requires an adapting of the stub axle bolts.

But corresponding challenges with respect to the determining of a rotational angle of a reference component relative to an axial direction also occur in other fields of machine-, systems-, and vehicle construction, which challenges are subject to similar constraints.

There is therefore a need to provide a rotational angle sensor which makes possible a simpler and/or smaller construction.

SUMMARY

A rotational angle sensor according to an exemplary embodiment for determining a rotational angle of a reference component with respect to an axial direction comprises a magnet retaining component including a magnet, wherein the magnet retaining component is formed to be connectable to the reference component for rotation therewith but axially displaceable, a sensor attached so as to be able to rotate with respect to the reference component, which sensor is formed to detect a magnetic field generated by the magnet, and a spring element which is formed to exert an axial force on the magnet retaining component such that an axial distance between the sensor and the magnet assumes a predetermined value, wherein the magnet retaining component is further formed to provide the connection to the reference component for rotation therewith via an interference-fit connection.

A rotational angle sensor according to an exemplary embodiment is thus based on the recognition that a simpler and/or more compact construction can be made possible in that instead of a friction-fit connection between a component retaining the magnet, an interference-fit connection is used with respect to the magnet retaining component. For this purpose the rotational angle sensor according to an exemplary embodiment includes just the magnet retaining component which is connectable to the reference component for rotation therewith, wherein the connection for rotation therewith is provided via an interference-fit connection.

Since an interference-fit connection is used instead of a friction-fit connection, the individual components of a rotational angle sensor according to an exemplary embodiment can designed more compact and smaller. In contrast to a friction-fit connection, the need is eliminated in particular to provide a sufficient normal- or contact pressure between the reference component and the magnet retaining component of the rotational angle sensor to even make possible the friction-fit connection. Due to the elimination of the need to apply a corresponding force, the individual components of the rotational angle sensor are embodied more compactly. The individual components can likewise also be designed for lesser loads so that small components can also be used for this reason as well.

An exemplary embodiment can also make it possible to make unnecessary an adapting of already-existing or current components or parts. A modification of the reference component or of the structure can thus optionally be eliminated, which can significantly reduce the complexity and the costs connected thereto for an adapting of the system that will integrate the rotational angle sensor. A rotational angle sensor according to an exemplary embodiment can thus be integrated in an existing structure directly and immediately-ready-for-operation ("Plug and Play").

In this case the spring element can compensate for possibly occurring tolerances in the axial direction of the component and/or of the rotational angle sensor or its components.

The reference component can, for example, be a stub axle bolt, or a kingpin of an Ackermann steering system, of a motor vehicle. However, it can also be another component of a subassembly, of a machine, or of a vehicle, for example a motor vehicle.

In an exemplary embodiment of a rotational angle sensor the sensor can be coupled to a housing of the rotational angle sensor for rotation therewith. The housing can then, for example, be mechanically coupled or connected to a further component, for example to a wheel support of an Ackermann steering system of a motor vehicle.

In an exemplary embodiment of a rotational angle sensor, the rotational angle sensor can be formed such that the magnet retaining component can be pushed over or onto the reference component in the axial direction to provide the interference-fit connection. For this reason the magnet retaining component is also referred to as a "cover component." It can thereby be possible to more easily install the rotational angle sensor even in difficult-to-access and/or difficult-to-see places. Due to the ability to push the magnet retaining component in the axial direction onto the reference component, a blind assembly in a place which can only be accessed with difficulty, for example in the area of the chassis of a motor vehicle, can be made easier.

In an exemplary embodiment of a rotational angle sensor the magnet retaining component can have a plurality of connecting edges extending parallel to the axial direction to provide the interference-fit connection. In this way a simple and/or stable connection of the magnet retaining component to the reference component can be achievable.

In such an exemplary embodiment of a rotational angle sensor the plurality of connecting edges can cut a sectional plane perpendicular to the axial direction in a plurality of intersection points which form corner points of a regular polygon. In this way a uniform load with respect to occurring forces can optionally be achievable. In this way a more flexible installation of the magnet retaining component on the reference component can likewise optionally be achievable, since due to the use of a regular polygonal shape the magnet retaining component is placeable onto the reference component, or connectable for rotation therewith, in a plurality of positions. Here a two-dimensional, equilateral, and equiangular polygon represents a regular polygon.

In an exemplary embodiment of a rotational angle sensor the plurality of connecting edges can comprise an even number of connecting edges. Likewise, in an assembled state only every second connecting edge of the plurality of connecting edges can be in contact with a corresponding opposing connecting edge or a corresponding opposing connecting surface. In this way a more exact pre-assembly or pre-adjustment can optionally be achievable since the magnet retaining component is connectable to the reference component, for rotation therewith, in a larger number of positions. Such an implementation can for example be particularly interesting if the component or a component mechanically connected thereto in the region wherein the magnet retaining assembly is to be installed already has a polygonal shape, for example an external hexagon for installation using a tool key. In such a case an implementation of a rotational angle sensor according to an exemplary embodiment on an existing system can thereby optionally be further simplified.

An exemplary embodiment of a rotational angle sensor can further include a connecting component that is mechanically connectable to the reference component and formed so as to provide the interference-fit connection to the magnet retaining component. In an exemplary embodiment of a rotational angle sensor the magnet retaining component can also alternatively or additionally be formed such that it is directly attachable to the reference component to provide the interference-fit connection. It can thereby be possible to make possible a simpler and/or optionally more flexible implementation of a rotational angle sensor according to an exemplary embodiment in an already-existing system or a system constituted for other reasons by adapting only the magnet retaining component or by providing the connecting component. Thus, for example, a connecting component having an internal thread and a polygonal external cross-section can be used if the reference component whose rotational angle is to be determined has, for example, a corresponding external thread. The polygonal cross-section on the external region of the connecting component can then be used for creating the connection having interference-fit and for mutual rotation between the magnet retaining component and the reference component.

In an exemplary embodiment of a rotational angle sensor the magnet retaining component can be produced from a plastic or a metal plate. In this way it can be possible to adapt a rotational angle sensor according to an exemplary embodiment to different reference components only by exchanging or adapting the cover component. Likewise it can be possible in this way to further simplify a rotational angle sensor according to an exemplary embodiment.

In an exemplary embodiment of such a rotational angle sensor the magnet can be mechanically connected to the magnet retaining component using a materially-bonded connection, for example using an adhesive, and/or using a friction-fit connection, for example a clamping or a crimping, and/or using an interference-fit connection, for example a retainer provided on the magnet retaining component and/or a depression (recessed section in a mounting surface), facing the sensor in an assembled state, to the cover component. Likewise the magnet can also optionally be cast in the magnet retaining component which is also referred to as a "cap," encapsulated therewith, or injected using a plastic or a polymer. Optionally in this way manufacturing of the rotational angle sensor can possibly be simplified.

An exemplary embodiment of a rotational angle sensor can further comprise a bearing which is connected to a housing of the rotational angle sensor for rotation therewith, wherein in an installed state the bearing is in contact with the magnet retaining component due to the force exerted by the spring element such that the axial distance between the sensor and the magnet assumes the predetermined value. In this way it can be possible to provide a defined distance between the sensor and the magnet independent of tolerances or other disrupting influences, e.g. due to thermal effects or wear.

In an exemplary embodiment of a rotational angle sensor the bearing can be such a bearing that substantially only passes on forces along the axial direction, and/or wherein the bearing is an axial plain bearing, and/or wherein the bearing has a load rating for an axial load of at most 2 kN. It can thereby be possible to embody the rotational angle sensor according to an exemplary embodiment in a more compact manner. This is possible since the occurring forces can be reduced with respect to a conventional implementation in a manner which depends on the design, so that smaller bearings, for example an axial plain bearing, which is substantially only designed for supporting and passing on axial forces, however not for supporting and passing on radial forces, and/or a bearing having a comparatively small load rating for axial loads can also be used. In further exemplary embodiments the bearing can also be embodied such that it has a load rating for an axial load which is at most 1.2 kN or at most 1 kN.

In an exemplary embodiment of a rotational angle sensor including a bearing the spring element can be disposed such that it presses against the magnet retaining component. In other words, the spring element can be disposed between the magnet retaining component and the reference component and/or the optionally integrated connecting component such that the spring element is loaded under pressure. In this way it can be possible to make possible a simpler installation of the rotational angle sensor on the reference component since the spring element can be inserted into the magnet retaining component optionally prior to the installation. A blind installation or an installation in a place which can only be accessed with difficulty can thus optionally be simplified. A spring element can for example be a spring ring, a disc spring, a barrel spring, a coil spring, or a gas spring.

A rotational angle sensor according to an exemplary embodiment can be formed to be used as a rotational angle sensor of an Ackermann steering system of a motor vehicle, for example of a truck or of a bus, wherein the reference component is a stub axle bolt or kingpin of the Ackermann steering system of the motor vehicle, and wherein a housing of the rotational angle sensor is coupled to the stub axle of the Ackermann steering system.

Here a friction-fit connection takes place due to static friction, a materially-bonded connection due to molecular or atomic interactions and forces, and an interference-fit connection due to geometric connection of the respective connection partners. The static friction presupposes in particular a normal force component between the two connection partners.

BRIEF DESCRIPTION OF THE DRAWINGS

Exemplary embodiments are described and explained in more detail below with reference to the accompanying Figures.

DETAILED DESCRIPTION

In the context of the present description, summarizing reference numbers are used for objects, structures, and other components if the relevant component is described with respect to itself or a plurality of corresponding components within an exemplary embodiment or within a plurality of exemplary embodiments. Passages of the description which refer to a component are therefore transferable to other components in other exemplary embodiments, insofar as this is not explicitly excluded or this follows from the context. If individual components are referred to, individual reference numbers are used which are based on the corresponding summarizing reference numbers. In the following description of embodiments, like reference numbers refer to like or comparable components.

Components which occur multiple times in an exemplary embodiment or in different exemplary embodiments can thereby be embodied or implemented identically and/or differently with respect to some of their technical parameters. It is thus for example possible that a plurality of entities can be implemented identically within an exemplary embodiment with respect to one parameter, but differently with respect to another parameter.

Figure 1:
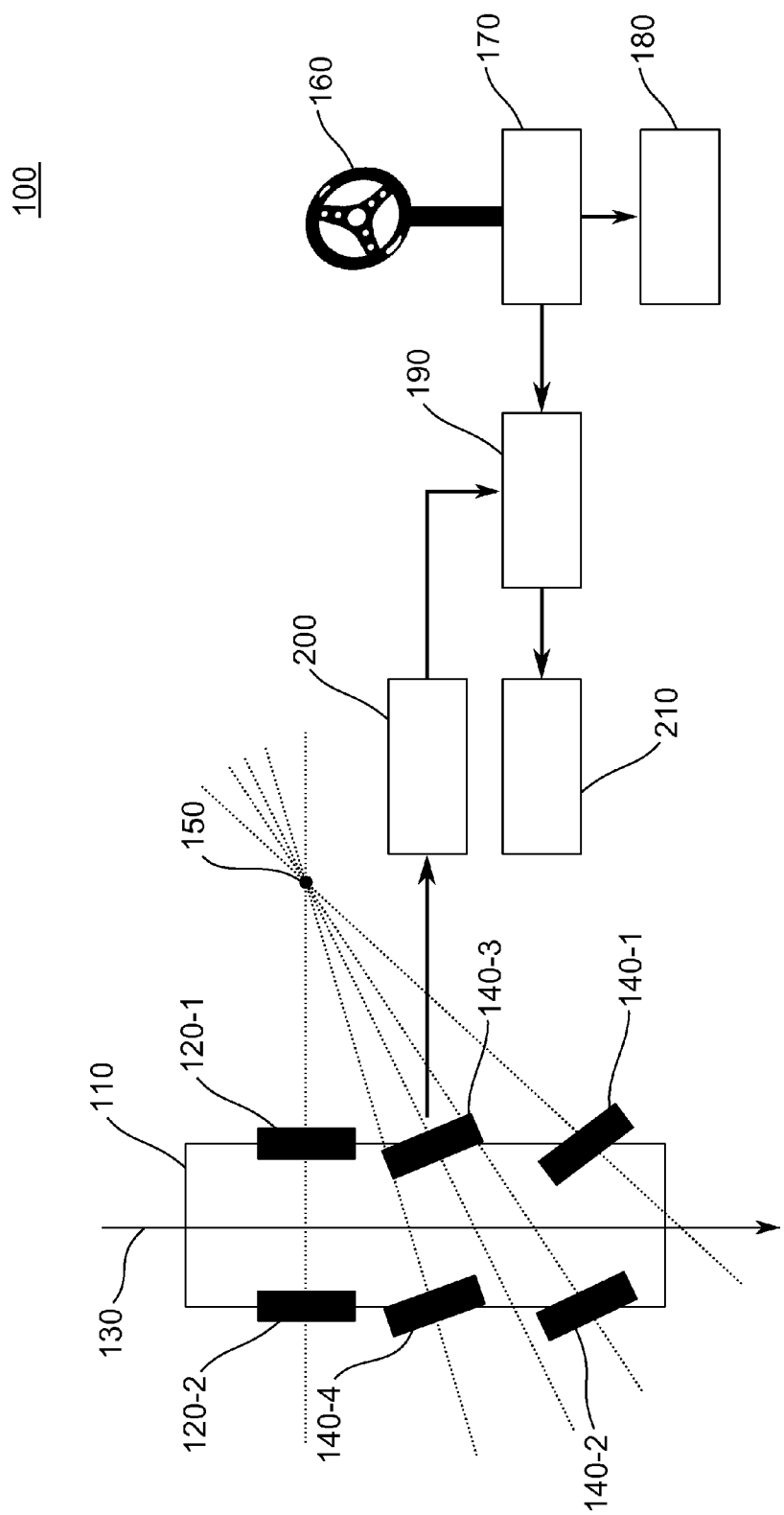
FIG. 1 shows a schematic illustration of a steering system.

FIG. 1 shows a schematic illustration of a steering system 100, within which a rotational angle sensor according to an exemplary embodiment can be used. FIG. 1 thus shows a motor vehicle 110 which can for example be a truck. The motor vehicle 110 includes two non-steerable wheels 120-1 and 120-2. In addition a total of four steerable wheels 140-1, . . . , 140-4 are disposed in the front in a longitudinal direction 130, which are each illustrated in a rotated or steered state with respect to the longitudinal direction 130.

The vehicle 110 has an Ackermann steering system so that the individual wheels 120, 140 are disposed substantially parallel to the direction of travel 130. In order to make possible driving around a curve as tension-free as possible, the extensions of the axes of the wheels 120, 140 should intersect in a common curve center point 150, as is also shown in FIG. 1. In this way the individual wheels 120, 140 not only roll about different radii, but the steered wheels 140 are also skewed at individual steering angles with respect to the longitudinal direction 130 from their straight position.

The steerable wheels 140 should thus be controlled by a steering system 100 such that upon a rotating of a steering wheel 160 or by an actuating of another control element by the driver, the motor vehicle 110 moves along a curve. Such a steering system 100 can for example operate on the basis of a mechanical controlling of the individual steerable wheels 140 which can optionally be supported by electrical, hydraulic, or optionally pneumatic actuators. In addition, in principle a steering system 100 can also be implemented without a corresponding mechanical coupling between the steering wheel 160 and the steerable wheels 140 such that the individual steerable wheels 140 are autonomously moved by actuators. The corresponding actuators can in turn be electrical, hydraulic, or optionally pneumatic actuators.

The steering system 100 thus includes a steering wheel 160 that is mechanically coupled with a steering wheel angle sensor 170. The two front steerable wheels 140-1 and 140-2 can thus be steered purely mechanically, supported by an actuator, or also autonomously actuated from one or more actuators via a front wheel adjustment 180, as is illustrated by the mechanical coupling between the front wheel adjustment 180 and the two wheels 140-1 and 140-2 marked as an arrow in FIG. 1.

The steering wheel angle sensor 170 is coupled to an electronic control unit (English Electronic Control Unit, ECU) 190 such that a steering signal of the steering wheel angle sensor 170 including information with respect to the turning angle of the steering wheel 160 is transmitted thereto. The electronic control unit 190 is further coupled to a steering angle sensor 200 such that a corresponding output signal including information with respect to the steering angle of the respective steerable wheels 140-3 (and optionally 140-4) is also transmitted to the electronic control unit 190). Based on the steering wheel angle of the steering wheel angle sensor 170 and the steering angle of the steering angle sensor 200 the electronic control unit 190 can output a corresponding control signal to an actuator 210 which is mechanically coupled to the respective wheel 140, as is in turn indicated in FIG. 1 by an arrow. Here the actuator 210 can in turn also change the steering angle of the respective wheel 140 corresponding to the control signal of the electronic control unit 190, in the context of a supporting or autonomously.

A closed control loop in the steering system 100 shown in FIG. 1 is thus provided via the steering angle sensor 200, the actuator 210, and the electronic control unit 190, which closed control loop makes possible a compact, robust, and precise controlling of the individual steering angles of the steerable wheels 140 at least—depending on the specific implementation—on the rear steering axle including the two steerable wheels 140-3 and 140-4.

A rotational angle sensor according to an exemplary embodiment can thereby be used both as steering angle sensor 200 and as steering wheel angle sensor 170. Depending on the specific implementation of a corresponding sensor, in the case of a steering wheel sensor 170 it can, for example, be advisable to not only provide the actual angles in an angular range between 0° and 360° or −180° and +180° in the context of the output signal itself, but also information about complete revolutions (360°) in case the component coupled to the steering wheel sensor has arotational angle range of more than 360°.

Figure 2:
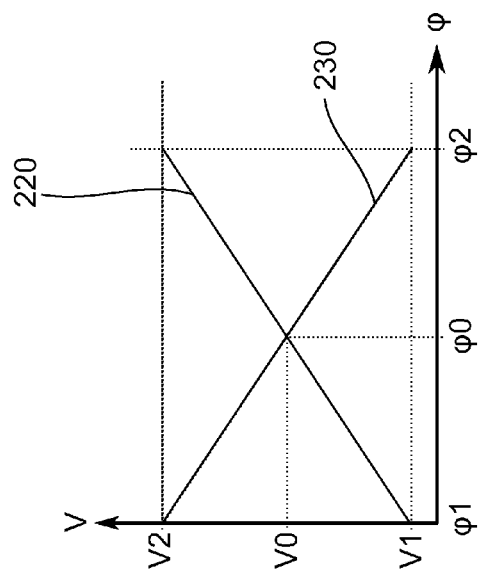
FIG. 2 schematically shows possible electrical output-characteristic-lines of a rotational angle sensor according to an exemplary embodiment.

FIG. 2 shows a schematically simplified illustration of two characteristic lines 220, 230 of an output signal of a rotational angle sensor according to an exemplary embodiment, such as can be used for example as steering angle sensor 170. The characteristic lines thereby place a steering angle φ in relation to a voltage value V of the output signal. If the steering angle φ thereby changes in an angular range between the values φ1 and φ2, the steering angle 170 can for example output a voltage value in the voltage interval V1 (e.g. V1=0.5V) to V2 (e.g. V2=4.5V).

The two characteristic lines 220, 230 are in this case linear, so that a steering angle φ in the center of the interval specified by the values φ1 and φ2, which steering angle φ0 corresponds to straight-ahead driving (along the longitudinal direction 130 of the motor vehicle 110) also corresponds to an average value V0 (in the example above, i.e., V0=2.5V) of the boundary values V1 and V2 of the corresponding voltage interval. The two characteristic lines 220, 230 thereby differ only in terms of their slopes. With the characteristic line 220 the voltage V increases linearly with the steering angle φ, while it correspondingly falls with the characteristic line 230.

Of course with other steering angle sensors, other voltage values and/or other, for example non-linear, characteristic lines can be used, which for example have a different slope in the range of the longitudinal direction 130 in comparison to larger steering angles.

Figure 3:
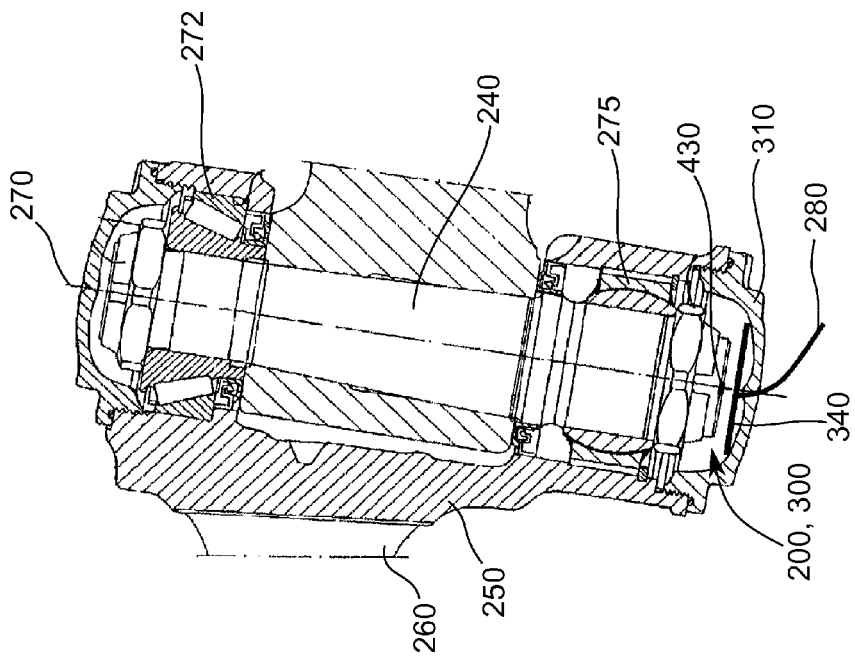
FIG. 3 shows a simplified cross-sectional representation of a rotational angle sensor according to an exemplary embodiment integrated on a stub axle bolt.

FIG. 3 shows a cross-sectional illustration of a stub axle bolt 240 and a wheel support 250 including a stub axle 260 on which a steerable wheel 140 (not shown in FIG. 3) can be rotatably attached. For this reason the stub axle 260 is referred to as a wheel stump.

In this case the wheel support 250 is disposed with respect to the stub axle bolt 240 so as to be able to rotate about a direction of rotation 270 extending therethrough. The stub axle bolt 240 can optionally also make possible a tilting of the wheel support 250 in a direction perpendicular to the axis of rotation 270, for which reason this is also referred to as a kingpin. Corresponding tiltings of the wheel support 250 can occur during a compressing or rebounding of the wheel or during an occurrence of steering-, acceleration-, or deceleration forces. The stub axle bolt 240 is in this case supported on the wheel support 250 via a tapered roller bearing 272 and a spherical plain bearing 275.

In this case the steering angle sensor 200 is disposed on the wheel support 250 between the stub axle bolt 240 and a corresponding recess. For transmitting of the output signal including the information about the steering angle the steering angle sensor 200 can be electrically coupled via an electrical terminal 280 to the electronic control unit 190 of the steering system shown in FIG. 1.

As has already been explained above, the steering angle sensor 200 can be embodied as rotational angle sensor 300 according to an exemplary embodiment. In this case a housing 310 of the steering angle sensor 300 can be mechanically connected to the wheel support 250. FIG. 3 thus only partially indicates the components of the rotational angle sensor 300, while for the sake of clarity some of them are not shown at all. FIG. 3 thus schematically shows the rotational angle sensor 300 only with a circuit board 340, on which a sensor not shown in FIG. 3 is disposed, and a magnet 430 which is attached on a magnet retaining component, also not shown in FIG. 3. Further components, such as a spring element but also other optional components, are also not shown in FIG. 3.

FIG. 3 thus shows a rotational angle measurer, integrated with a cover, between the stub axle bolt 240 and the stub axle 260 or the wheel support 250. As will be explained below, in the case of a corresponding design of the rotational angle sensor 300 according to an exemplary embodiment this can be coupled to the stub axle bolt 240 in an immediately-ready-for-operation manner, without, for example, having to post-process these.

Figure 4:
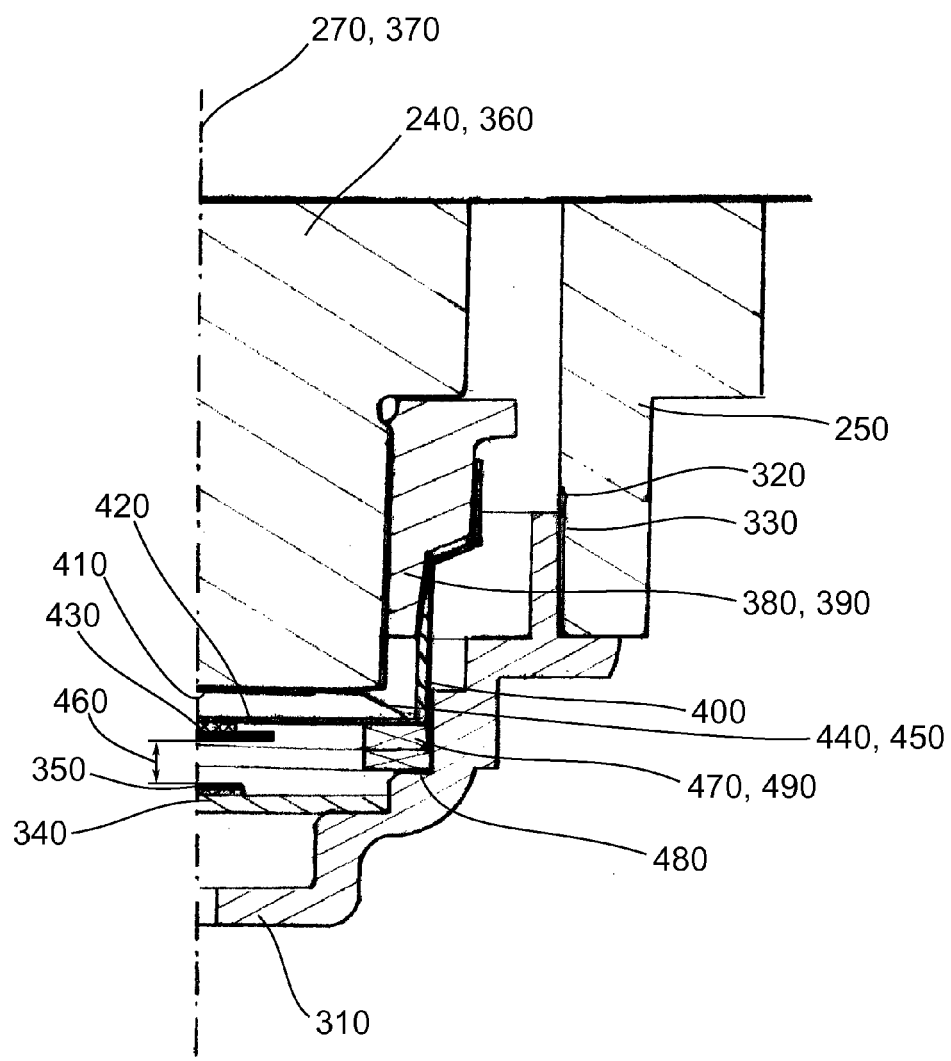
FIG. 4 shows a cross-sectional representation of a rotational angle sensor according to an exemplary embodiment.

FIG. 4 shows a cross-sectional illustration of a rotational angle sensor 300 according to an exemplary embodiment. More specifically, the rotational angle sensor 300 is the steering angle sensor already shown in FIG. 3. In this case the rotational angle sensor 300 includes a housing 310 which is screwed to the wheel support 250 via an internal thread 320 of the wheel support 250 and a corresponding external thread 330 of the housing 310.

A circuit board 340 is disposed in the housing 310 so as to rotate therewith. A sensor 350 is disposed on the circuit board 340, which sensor 350 is formed to make a magnetic field or a magnet flux density electrically detectable. For this purpose the sensor is formed to output an appropriate sensor signal. The sensor 350 can thus, for example, be embodied based on a Hall-effect sensor element or also based on a magnetoresistive sensor element.

The circuit board 340 can optionally include a driver circuit, an amplifier circuit, and/or an evaluation circuit, using which the sensor signal provided by the sensor 350 can optionally be amplified and a characteristic line (220, 230) can accordingly be prepared. The optional circuit components can then be output as the output signal of the rotational angle sensor 300 to the electronic control unit 190 via the terminal 260, which is not shown in FIG. 4.

As has already been explained in connection with FIGS. 1 and 3, the wheel support 250 or the steerable wheel 140 attached thereon pivots about the stub axle bolt 240 during a change of the steering angle of the respective wheel. It therefore represents the reference component 360, with respect to which the rotational angle sensor 300 makes a rotational angle detectable. The axis of rotation 270 already shown in FIG. 3 thus corresponds to an axial direction 370 around which the rotation sensor 300 can detect the rotational angle.

In this case the reference component 360 is mechanically connected to a connecting component 370. In the exemplary embodiment shown in FIG. 4 the connecting component 380 is embodied in the form of a nut 390 which is mechanically connected to the stub axle bolt 240 or the reference component 360 via a screw connection.

On an outer side the nut 390 has a regular polygonal form via which the nut can be screwed to the stub axle bolt 240 using a corresponding tool key. In the exemplary embodiment shown here the connecting component 380 or the nut 390 thus has a regular hexagon on its outer side.

The rotational angle sensor 300 further comprises a magnet retaining component 400 which is mechanically coupled to the connecting component 380 or the nut 390 via an interference-fit connection so as to rotate therewith. In this case, however, the magnet retaining component 400 is displaceable axially, i.e. along the axial direction 370.

For this purpose the magnet retaining component 400 has a plurality of connecting edges extending parallel to the axial direction 370. In this case the magnet component 400 shown in FIG. 4 is not only displaceable along the axial direction 370, but can be pushed onto this or via this from an underside 410 of the reference component 370. For this reason the magnet retaining component 400 is also referred to as a "cover component" or as a "cover." This is achieved in the exemplary embodiment shown in FIG. 4 in that the magnet retaining component 400 is formed hollow-cylinder-shaped without overhanging edges.

In other words, starting from an attachment surface 420 the magnet retaining component 400 has a profile which in an installed state does not taper or only slightly tapers along the axial direction. In this case the attachment surface 420 is oriented substantially perpendicular to the axial direction 370 and intersects this.

A magnet 430 on the magnet retaining component 400 is attached to the attachment surface 420, which faces away from the reference component 360 or the stub axle bolt 240. In this case the magnet 430 can be connected in a materially-bonded manner, for example using an adhesive, in a friction-fit manner, for example using a clamping or a crimping, and/or in an interference-fit manner, for example using a retainer and/or a depression.

In this case the magnet 430 generates a magnetic field or a magnet flux density which can be detected by the sensor 350. In this case the magnet 430 and the sensor 350 are disposed such that in the case of a rotating of the reference component 360 or of the stub axle bolt 240 about the axial direction 370, a change of the magnet flux is effected in the sensor, which change is then output therefrom as the sensor signal or by the optional integrated circuit on the circuit board 340 as the output signal. The rotational angle sensor 300 is thereby in the position to detect a rotational angle of the reference component 360 with respect to the axial direction 370.

In the exemplary embodiment shown in FIG. 4 a spring element 440 in the form of a spring ring 450 is integrated between the magnet retaining component 400 and the reference component 360. In this case the spring element 440 is loaded under pressure and thus generates a force, directed downward in FIG. 4, on the magnet retaining component 400.

The spring element 440, which is also referred to as "loading spring," is provided here to compensate for axial tolerances and to produce an axial spacing 460 between magnet 430 and sensor 350 which axial spacing 460 is as independent as possible from these axial tolerances. Corresponding tolerances can arise, for example, due to thermal expansion, but also due to installation-related or manufacturing-related tolerances.

In order to limit movement of the magnet retaining component 400 and of the magnet 430 attached thereto along the axial direction 410, the rotational angle sensor 300 further comprises a bearing 470 which is disposed between the magnet retaining component 400 and a housing shoulder 480 of the housing 310. The bearing 400 is an axial plain bearing 490 which is formed and disposed such that it substantially supports and passes on forces forces along the axial direction, i.e. axial forces. In contrast thereto the bearing 470 is not in the position to support radial forces to an appreciable degree. In other words, the bearing 470 is formed and disposed such that it substantially cannot support and pass on radial forces.

This implementation is based on the idea that the reference component 360 or the stub axle bolt 240 typically requires no additional radial guiding. The bearing 470 can also be designed relatively small, since it must only transmit the forces of the spring element 440 to the housing 310. Thus in many exemplary embodiments a bearing 470 having a load rating for axial loads of at most 2 kN, in other exemplary embodiments of at most 1.2 kN or of at most 1 kN, can be used.

Optionally instead of the bearing 470 a different means for fixing the axial spacing 460 can also be used. Thus, for example, instead of a bearing 470 on the magnet retaining component 400 or on the housing shoulder 480, one single or more sliding surfaces can be provided to reduce the rotational movement of the reference component 360 in view of friction and/or wear.

In comparison to a conventional solution, such as is still to be described in connection with FIG. 5, just by using a pressure sensor 300 according to an exemplary embodiment a space savings can be achieved by an interference-fit connection now being used instead of a friction-fit connection between a corresponding carrier of the magnet and the stub axle bolt. For this reason the need is eliminated to support the normal force needed for static friction, which normal force also has at least one component in the axial direction. The need is also eliminated to support radial forces which can possibly be caused by force components in the radial direction which are necessary for maintaining the required friction-fit connection.

Due to the spring element 440 and the bearing 470 it is thus possible in the rotational angle sensor 300 shown in FIG. 4 to fix the axial spacing 460 between the sensor 350 and the magnet 430 to a predetermined value. Changes of the geometric relationships due to the above-described tolerances can thereby be absorbed, so that even under such conditions the axial spacing 460 between the sensor 350 and the magnet 430 remains constant.

Figure 5:
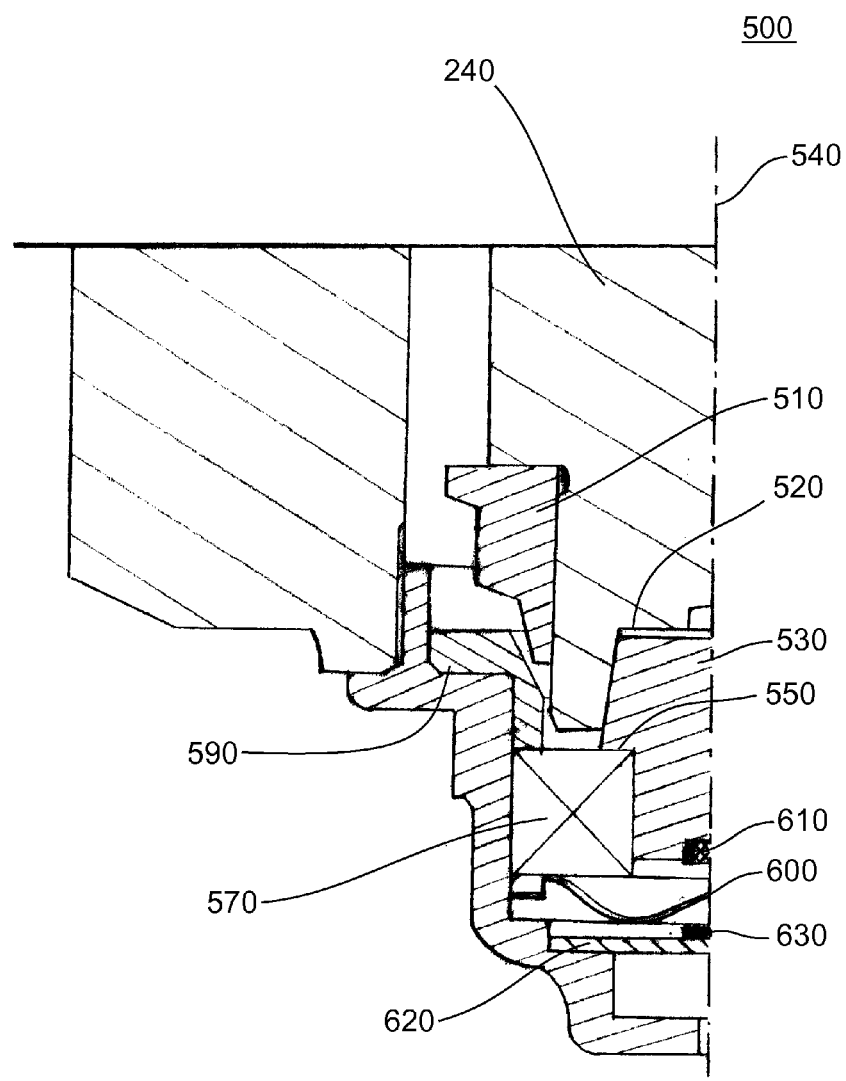
FIG. 5 shows a cross-sectional representation of a conventional rotational angle sensor.

FIG. 5 shows a cross-sectional illustration, comparable to FIG. 4, of a conventional rotational angle sensor 500. The rotational angle sensor 500 shown in FIG. 5 also comprises a nut 510 which is screwed to the stub axle bolt 240 via corresponding threads of the two components.

In the conventional rotational angle sensor 500 shown in FIG. 5, the stub axle bolt 240 has a truncated-cone-shaped depression 520 into which a truncated-cone-shaped shaft 530 is inserted whose angle coincides with the corresponding angle of the recess 520. The shaft 530 has an annularly circulating shoulder 550 onto which an inner ring of a ball bearing 570 abuts. An outer ring of the ball bearing 570 is disposed between a recess 590 and a spring ring 600 such that the spring ring 600 exerts a force on the outer ring of the ball bearing 570 and thus—via the inner ring and the truncated-cone-shaped shaft 530—on the stub axle bolt 240.

A magnet 610 is attached to an underside of the truncated-cone-shaped shaft 530, which magnet 610 in turn opposes a circuit board 620 including a sensor 630. Here also the sensor 630 is in turn in the position to detect a change of a magnetic field or of a magnet flux density and output a corresponding sensor signal.

The conventional rotational angle sensor 500 shown in FIG. 5 differs from the rotational angle sensor 300 according to an exemplary embodiment shown in FIG. 4 not only in that the magnet retaining component 400 is coupled there to the reference component 360 via an interference-fit connection, but rather also by the arrangement of the spring ring 600 and of the spring element 440. In the conventional rotational angle sensor 300 from FIG. 5 the spring ring 600 is thus disposed between the magnet 610 and the sensor 630. It can thereby result that a spacing between the magnet 610 and the sensor 630 differs during operation and/or between individual rotational angle sensors 500. As a consequence it can result that the measurement accuracy of the sensors can be subject to temporal and/or operational changes. It can likewise result that rotational angle sensors 500 which are used with different wheels of a vehicle work with different accuracy or have different tolerances, which are due to the different spacings between magnet 610 and sensor 630.

In contrast thereto the spring element 440 in the rotational angle sensor 300 according to an exemplary embodiment is not disposed between magnet 430 and sensor 350, so that the axial spacing 460 is not influenced by the spring element 440. The spring element 440 is there, rather, to press the magnet retaining component 400 against the bearing 470 and thus fix the axial spacing 460 at its predetermined value.

Due to the arrangement of the filter element 440 above the magnet retaining unit 400, it can also be installed more easily during an installation, for example, carried out blind or an installation at a difficult-to-access or confined location. In this case the spring element 440 can thus be inserted in the magnet retaining component 400, while it is then correspondingly shifted on the connecting component 370 (the nut 380) along the axial direction 410.

A rotational angle sensor 300 according to an exemplary embodiment, as is shown, e.g., in FIG. 4, makes possible the compact construction not least in that the connection of magnet retaining component 400 and reference component 360 is effected via an interference-fit connection. Due to the elimination of the friction-fit connection, the truncated-cone-shaped shaft 530 can thus in particular be omitted, which conventionally represents a considerable metallic volumetric component which is accompanied by a corresponding weight. Due to the forces required for the friction-fit a size reduction is ruled out.

Due to the change to an interference-fit connection of the magnet retaining component 400 to the reference component 360, the prevailing forces can be significantly reduced. It is thereby not only possible to exchange the ball bearing 570 designed for significantly higher load ratings for a smaller bearing 470 as has been described above. Moreover, it is also possible to produce the magnet retaining component 400 such that it is very weight-reduced. Thus it can be produced, for example, from a (metallic) plate or from a plastic, whereby the described weight- and/or volume savings can also be realized. The complex post-processing of the stub axle bolt 240 and the providing of the depression 520 can also be eliminated, which significantly simplifies the implementation of a rotational angle sensor 300 according to an exemplary embodiment.

Figure 6A:
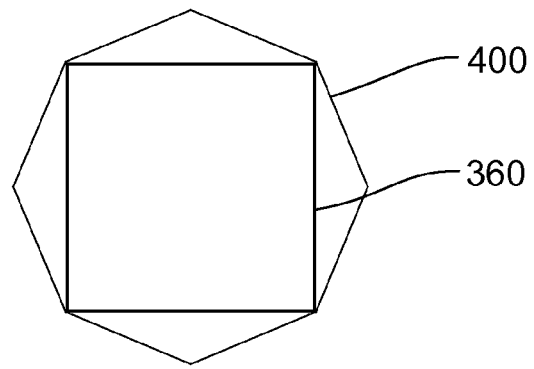
FIGS. 6a to 6c show different designs of magnet retaining components of a rotational angle sensor according to an exemplary embodiment.
Figure 6B:
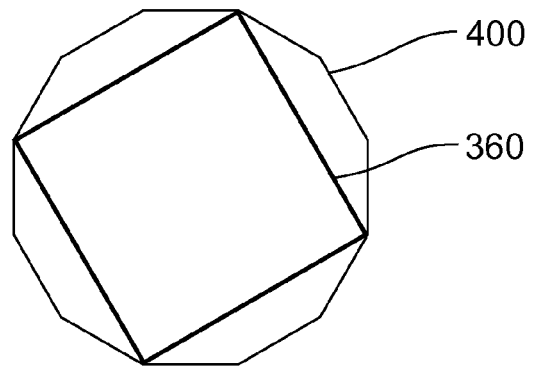
Figure 6C:
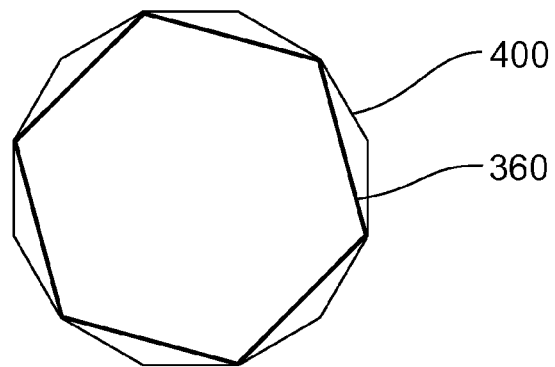

FIGS. 6a to 6c schematically show highly simplified top views of the reference component 360 and the magnet retaining component 400 in different exemplary embodiments of a rotational angle sensor 300. As has already been explained, a connecting component 380 for providing the interference-fit connection can be attached to the reference component 360 (e.g. stub axle bolt 240). If the reference component 360 has a corresponding thread, the connecting component 380 can, for example, be a nut 390. For simple attachment this very often has a polygonal, usually hexagonal, cross section on its external edge to make possible a simple installation using a tool key.

In such a case the magnet retaining component 400 can have a plurality of connecting edges extending parallel to the axial direction 370 to provide the interference-fit connection. In this case the plurality of the connecting edges intersect a sectional plane, which is shown in the FIGS. 6a to 6c described further below, perpendicular to the axial direction 370 in a plurality of intersection points which form corner points of a regular polygon.

If, for example, the connecting component 380 thus has a regular hexagon as cross-section, the magnet retaining component 400 can also have six connecting edges disposed in the form of a regular hexagon. The magnet retaining component 400 can thereby be pushed onto the reference component 360 in six orientations; in the general case in a number of orientations which corresponds to the number of connecting edges. A pre-adjustment of the magnet 430 can thereby be effected.

In other exemplary embodiments the plurality of connecting edges can also comprise a whole-numbered multiple of the corresponding opposing connecting edges or—connecting surfaces. In this way there is the possibility to further refine the pre-adjustment since the magnet retaining component 400 can be attached to the reference component 370 in a larger number of orientations. Thus the plurality of connecting edges can comprise an even number of connecting edges, wherein in an installed state only every second connecting edge of the plurality of connecting edges is in contact with a corresponding opposing connecting edge or a corresponding opposing connecting surface. In this way a good compromise between pre-adjustment possibilities on the one hand and stability of the interference-fit connection on the other hand can optionally be achieved, since a reduction of the stability of the connection could also possibly accompany an increase of the number of the connecting edges.

To illustrate this in more detail, a reference component 360 (or alternatively a corresponding connecting component 380) is respectively shown in FIGS. 6a and 6b, which reference component 360 has a quadrangular (square) cross-section. In the situation shown in FIG. 6a the magnet retaining component 400 has a regular octagonal cross-section, so that the magnet retaining component 400 can be pushed onto the reference component 360 in a total of 8 orientations.

In contrast thereto, in the situation shown in FIG. 6b the magnet retaining component 400 has a regular, dodecagonal cross-section, so that only every third connecting edge of the magnet retaining component 400 is in contact with an opposing connecting edge of the reference component 360.

However, the comparison of FIGS. 6a and 6b shows that with increasing number of connecting edges of the magnet retaining component 400, its cross-sectional shape more closely approaches the circular shape, so that an increasing number of edges tends to threaten to reduce stability.

Finally FIG. 6c shows the situation with a hexagonal reference component 360 and a dodecagonal magnet retaining component 400. Of course, however, other interference-fit connections, for example based on guide ridges or guide bolts and guide slots, can also be used.

Exemplary embodiments of a rotation sensor 300 can represent an immediately-ready-for-operation solution for a steering angle sensor 200, which is also referred to as a kingpin sensor or a "kingpin encoder". Conventional solutions for a rotation—and/or angle-determining or—measuring require changes to existing components, in particular to the stub axle bolt 240. Exemplary embodiments are based on the consideration that the magnet retaining component 400 is attached to the reference component 360 by using the same or a similar shape therefor.

A constant axial spacing 460 or a constant air gap between sensor 350 and magnet 430—independent of interface tolerances of the stub axle bolt 240 and of the wheel support 250 thus leads to a higher measuring accuracy due to a better and/or smaller tolerance. To this end a preloaded spring element is inserted between the magnet retaining component 400 and the stub axle bolt 240.

In conventional rotational angle sensors, however, the interface of the stub axle 240 to the magnet holder must be modified, such that no immediately-ready-for-operation solution is available. Moreover, with many solutions the spacing between magnet and sensor is dependent on the tolerances of the stub axle bolt 240 and of the wheel support 250.

In the context of exemplary embodiments an internal cover (magnet retaining component 400) can thus be adapted to the nut 390 of the stub axle bolt 240, which for example has a hexagonal or dodecagonal cross-section. By using the (preloaded) spring element 440 the vertical spacing 460 is fixed so that the spacing is independent of tolerances.

Adaptations of the stub axle bolt 240 and its components can optionally possibly be eliminated. A complete ready-to-use solution can thus be achievable.

By using metal-plates or plastic components the rotational angle sensor 300 according to an exemplary embodiment can be embodied considerably lighter compared to solid metal parts. Likewise, the height of a rotational angle sensor 300 according to an exemplary embodiment can be reduced so that such a rotational angle sensor 300 can also be used in the installation space available with current applications. In contrast thereto the conventional magnet holder is a heavy metal part that is long in the axial direction.

Due to the better control of the air gap between sensor or encoder and magnet, the accuracy—as mentioned—can be significantly increased. This allows the use of more economical electronic components due to the use of an electronic tolerance compensation. Alternatively a greater angle-measurement accuracy can be achieved in the sense of a measurement accuracy and/or a repeatability. Among other things, an adapting of the stub axle bolt 240 can also be eliminated by using an exemplary embodiment of a rotation sensor 300.

The features disclosed in the above description, the claims, and the drawings can be meaningful for the realization of exemplary embodiments in their different designs, both individually and in any combination, and—provided nothing different results from the description—can be combined with one another in any way.

The invention claimed is:

1. A rotational angle sensor for determining a rotational angle of a reference component with respect to an axial direction, the rotational angle sensor comprising:
   a magnet retaining component including a magnet, the magnet retaining component being connectable to the reference component for rotation therewith, but being axially displaceable relative to the reference component;
   a sensor attached so as to be able to rotate with respect to the reference component and being configured to detect a magnetic field generated by a magnet; and
   a spring element configured to exert an axial force on the magnet retaining component in such a manner that an axial spacing between the sensor and the magnet assumes a predetermined value,
   wherein the magnet retaining component is further configured to provide the connection to the reference component for rotation therewith via an interference-fit connection.

2. The rotational angle sensor according to claim 1, wherein the rotational angle sensor is configured such that the magnet retaining component can be pushed over the reference component in the axial direction to provide the interference-fit connection.

3. The rotational angle sensor according to claim 1, wherein the magnet retaining component has a plurality of connecting edges extending parallel to the axial direction to provide the interference-fit connection.

4. The rotational angle sensor according to claim 3, wherein the plurality of connecting edges intersect a sectional plane perpendicular to the axial direction in a plurality of intersection points which form the corner points of a regular polygon.

5. The rotational angle sensor according to claim 4, wherein the plurality of connecting edges comprises an even number of connecting edges, and wherein in an installed state only every second connecting edge of the plurality of connecting edges is in contact with a corresponding opposing connecting edge or a corresponding connecting surface.

6. The rotational angle sensor according to claim 1, which further includes a connecting component configured to be mechanically connectable to the reference component and to provide the interference-fit connection to the magnet retaining component, and/or wherein the magnet retaining component is configured such that it is directly attachable to the reference component to provide the interference-fit connection, and/or wherein the magnet is encapsulated or injection molded with the magnet retaining component.

7. The rotational angle sensor according to claim 1, which further comprises a bearing connected to a housing of the rotational angle sensor for rotation therewith, wherein due to a force exerted by the spring element, in an installed state the bearing is in contact with the magnet retaining component such that the axial spacing between the sensor and the magnet assumes the predetermined value.

8. The rotational angle sensor according to claim 7, wherein the bearing is a bearing that substantially only transmits forces along the axial direction and/or wherein the bearing is an axial plain bearing, and/or wherein the bearing has a load rating for an axial load of at most 2 kN.

9. The rotational angle sensor according to claim 7, wherein the spring element is disposed such that it presses the magnet retaining component against the bearing.

10. The rotational angle sensor according to claim 1, which is configured as a rotational angle sensor of an Ackermann steering system of a motor vehicle, wherein the reference component is a stub axle bolt or kingpin of the Ackermann steering system of the motor vehicle, and wherein a housing of the rotational angle sensor is coupled with a stub axle of the Ackermann steering system.

11. The rotational angle sensor according to claim 9, wherein the spring element comprises a spring ring, or a disc spring, or a barrel spring, or a coil spring, or a gas spring.

12. The rotational angle sensor according to claim 1,
   wherein the rotational angle sensor is configured such that the magnet retaining component can be pushed over the reference component in the axial direction to provide the interference-fit connection,
   herein the magnet retaining component has a plurality of connecting edges extending parallel to the axial direction to provide the interference-fit connection,
   wherein the plurality of connecting edges intersect a sectional plane perpendicular to the axial direction in a plurality of intersection points which form the corner points of a regular polygon,
   wherein the plurality of connecting edges comprises an even number of connecting edges, and wherein in an installed state only every second connecting edge of the plurality of connecting edges is in contact with a corresponding opposing connecting edge or a corresponding connecting surface, and further including a connecting component configured to be mechanically connectable to the reference component and to provide the interference-fit connection to the magnet retaining component.

* * * * *